United States Patent
Han et al.

(10) Patent No.: US 8,134,264 B2
(45) Date of Patent: Mar. 13, 2012

(54) LARGE CAPACITY HOLLOW-TYPE FLYWHEEL ENERGY STORAGE DEVICE

(75) Inventors: Young Hee Han, Daejeon (KR); Se Yong Jung, Daejeon (KR); Jeong Phil Lee, Daejeon (KR); Byung Jun Park, Daejeon (KR); Byeong Cheol Park, Daejeon (KR); Nyeon Ho Jeong, Daejeon (KR); Tae Hyun Sung, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 197 days.

(21) Appl. No.: 12/560,383

(22) Filed: Sep. 15, 2009

(65) Prior Publication Data

US 2010/0231075 A1     Sep. 16, 2010

(30) Foreign Application Priority Data

Oct. 31, 2008   (KR) .................. 10-2008-0107772

(51) Int. Cl.
    *H02K 7/08*   (2006.01)
(52) U.S. Cl. .................................. 310/90.5; 310/74
(58) Field of Classification Search ............... 310/90.5, 310/90, 74
    See application file for complete search history.

(56) References Cited

U.S. PATENT DOCUMENTS 6,798,092 B1 *  9/2004  Gabrys et al. ............. 310/45

FOREIGN PATENT DOCUMENTS

| JP | 2003-239971 | | 8/2003 |
| JP | 2008-039163 | | 2/2008 |
| JP | 2008-086095 | | 4/2008 |
| KR | 2003076769 | A * | 9/2003 |
| KR | 1020030076769 | | 9/2003 |

* cited by examiner

*Primary Examiner* — Quyen Leung
*Assistant Examiner* — Leda Pham
(74) *Attorney, Agent, or Firm* — McDermott Will & Emery LLP

(57) ABSTRACT

Disclosed is a large capacity hollow-type flywheel energy storage device. The energy storage device includes a hollow shaft, a vacuum chamber receiving the hollow shaft, a flywheel having a predetermined weight and disposed at an inner edge of the vacuum chamber, and a hub connecting the flywheel to the hollow shaft and disposed in the vacuum chamber to be rotatable together with the flywheel. A superconductive bearing and an electromagnet bearing are disposed inside and outside the hollow shaft, respectively, such that magnetic forces thereof can be shielded from each other. Thus, magnetic interference between the superconductive bearing and the electromagnet bearing is shielded by the magnet shield interposed therebetween, thereby preventing rotation loss by stabilizing a structural mechanism during rotation while improving design adaptability.

1 Claim, 2 Drawing Sheets

LARGE CAPACITY HOLLOW-TYPE FLYWHEEL ENERGY STORAGE DEVICE

BACKGROUND OF THE INVENTION

1. Field of the Invention

The present invention relates to flywheel energy storage devices and, more particularly, to a large capacity hollow-type flywheel energy storage device that has improved stability and can minimize rotation loss.

2. Description of the Related Art

In general, power consumption largely varies between day and night in such a manner that it is very low at dawn but rapidly increases in the afternoon.

Thus, a power plant must be constructed to deal with the maximum load in the daytime irrespective of heavy economic loss. To level off the power consumption, a flywheel energy storage device is developed along with a pumping-up power generator, a device for midnight electricity, etc.

Such a flywheel energy storage device includes a motor generator, a flywheel and a bearing, and stores electric energy as inertial energy of the flywheel in a way of increasing a rotation speed of the flywheel using a motor to generate electricity using a generator connected to the flywheel, thereby enabling reuse of the electricity as needed.

Examples of the bearing for the flywheel energy storage device include a mechanical bearing, a superconductive bearing, a contactless electromagnet bearing, etc.

When using the mechanical bearing, the flywheel energy storage device operates not at high speed but at low speed, thereby providing small capacity. Further, friction loss is very severe during rotation. As a result, the flywheel energy storage device using the mechanical bearing has rarely been used.

When using the electromagnet bearing, the flywheel is floated by a repulsive force between an electromagnet and a permanent magnet. To maintain the floated state, the electromagnet must be precisely controlled. In this case, the electromagnet consumes a relatively large amount of energy, thereby lowering efficiency of the storage device.

When using the superconductive bearing, the flywheel is floated by floating and fixing forces between a superconductor and a magnet, and rotates at high speed without contact, thereby storing much energy in a small volume. However, a number of expensive superconductors are needed for floating the flywheel and eddy current loss increases in proportion to an area between the superconductor and the magnet. Thus, it is not easy to produce a large capacity flywheel energy storage device.

To solve these problems, there has been proposed a large capacity hollow-type flywheel energy storage device in which superconductive bearings and permanent magnet bearings are combined and disposed inside and outside a hollow shaft. The large capacity hollow-type flywheel energy storage device usually operates with a small rotation loss by minimizing the use of the electromagnet bearings and using the superconductive bearings to float a rotor. Here, only upon disturbance of the energy storage device, the electromagnet bearings are activated to suppress vibration and return to a state for minimizing power consumption.

In the large capacity hollow-type flywheel energy storage device, however, the electromagnet bearings and the superconductive bearings, all based on the magnetic force, must be spaced apart from each other in a longitudinal direction of the shaft to eliminate interference between the magnetic forces thereof when disposed inside and outside the hollow shaft.

Accordingly, the length of the hollow shaft is unnecessarily elongated to cause instability, so that rotation loss occurs due to a decrease in rotation speed, thereby lowering energy storage density.

SUMMARY OF THE INVENTION

Therefore, the present invention is directed to solving the above and other problems of the related art, and an aspect of the invention is to provide a large capacity hollow-type flywheel energy storage device which employs a combination of an electromagnet bearing and a superconductive bearing while removing interference between magnetic forces thereof, thereby preventing rotation loss.

In accordance with an aspect, the invention provides a large capacity hollow-type fly wheel energy storage device including a hollow shaft, a vacuum chamber receiving the hollow shaft, a flywheel having a predetermined weight and disposed at an inner edge of the vacuum chamber, and a hub connecting the flywheel to the hollow shaft and disposed in the vacuum chamber to be rotatable together with the flywheel, wherein a superconductive bearing and an electromagnet bearing are disposed inside and outside the hollow shaft, respectively, such that magnetic forces thereof are shielded from each other.

The large capacity hollow-type flywheel energy storage device may further comprise a magnet shield made of metal and cylindrically interposed between the superconductive bearing and the electromagnet bearing.

BRIEF DESCRIPTION OF THE DRAWINGS

The above and other aspects, features and advantages of the present invention will become apparent from the following description of exemplary embodiments given in conjunction with the accompanying drawings, in which.

DETAILED DESCRIPTION OF THE PREFERRED EMBODIMENTS

Figure 1:
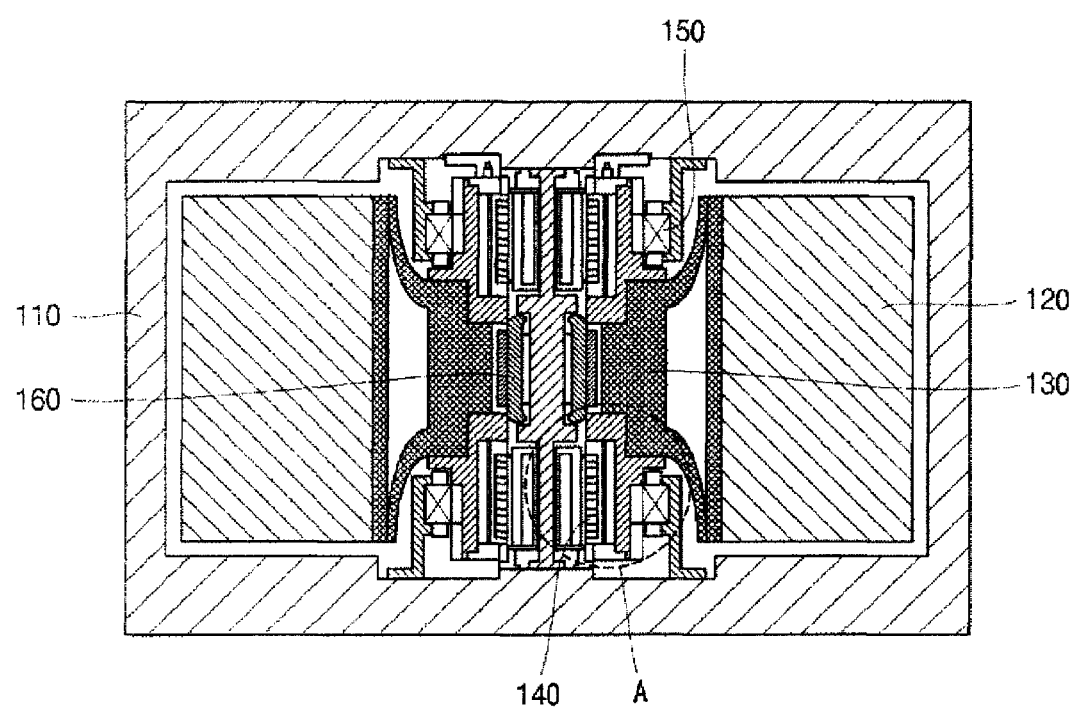
FIG. 1 is a sectional view of a large capacity hollow-type flywheel energy storage device according to one embodiment of the present invention.

Hereinafter, embodiments of the invention will be described in more detail with reference to the accompanying drawings.

For reference, terms or words used herein have not to be restrictively interpreted by a usual or lexical meaning, but interpreted by a meaning and concept matching with a technical idea of the invention on the basis of a principle that an inventor properly defines the concept of the term in order to optimally describe his/her own invention.

Accordingly, an embodiment described in this specification and configurations illustrated in the drawings are only an exemplary embodiment of the invention, and cannot speak for all the technical idea of the invention, so that it will be appreciated that various modifications and equivalents can be made as alternatives at the time of patent application.

Figure 2:
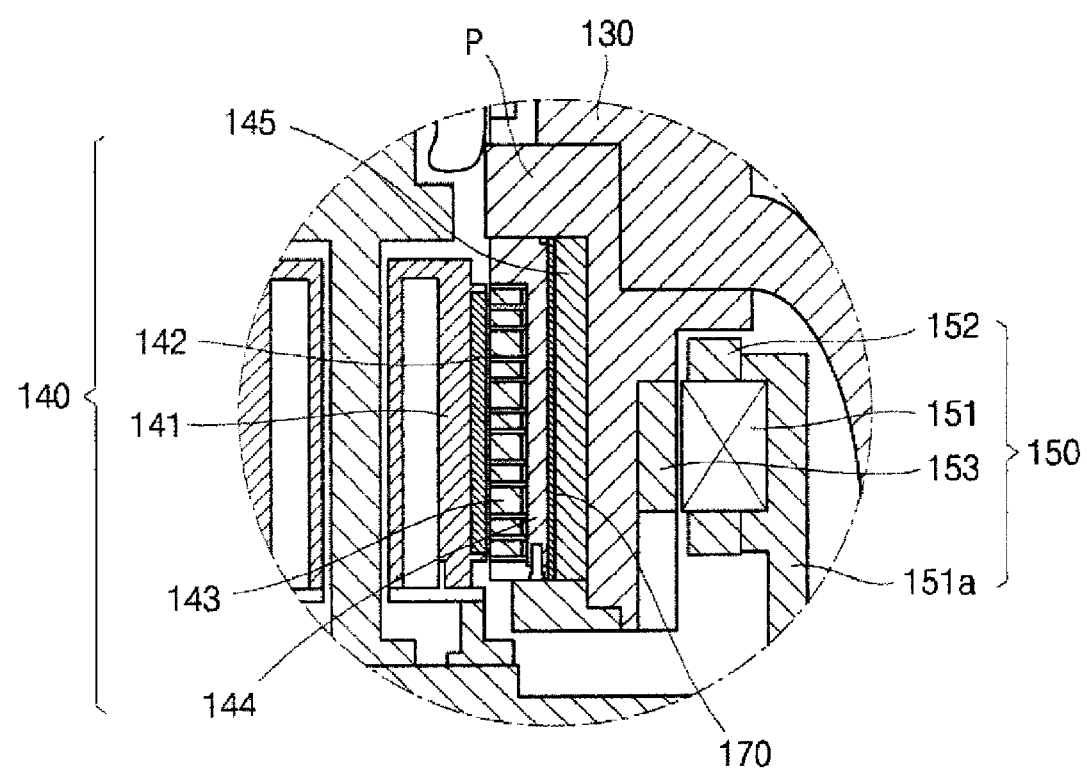
FIG. 2 is an enlarged sectional view of an "A" part in FIG. 1.

FIG. 1 is a sectional view of a large capacity hollow-type flywheel energy storage device according to one embodiment of the invention, and FIG. 2 is an enlarged sectional view of an "A" part in FIG. 1.

As shown therein, a large capacity hollow-type flywheel energy storage device according to one embodiment includes upper and lower hollow shafts P; a vacuum chamber 110 creating a high vacuum and receiving the upper and lower hollow shafts P at the center thereof; a flywheel 120 having a predetermined weight and disposed at an inner edge of the vacuum chamber 110; a hub 130 connecting the flywheel 120 to the hollow shafts P and rotatably disposed together with the flywheel 120 in the vacuum chamber 110; outer-ring type superconductive bearings 140 disposed inside the upper and lower hollow shafts P to control vibrations of the flywheel 120 and the hub 130, respectively; electromagnet bearings 150 disposed outside the upper and lower hollows P corresponding to the superconductive bearings 140 to control the vibrations of the flywheel 120 and the hub 130, respectively; a motor generator 160 disposed between the superconductive bearings 140 to minimize the vibrations when rotated; and a magnet shield 170 made of metal and shielding magnetic forces of the superconductive bearings 140 and the electromagnet hearings 150 from each other.

Here, the superconductive bearing 140 includes a freezing tank 141 to store liquid nitrogen as a cooling fluid inside the upper and lower hollow shafts P; a superconductor 142 disposed outside the freezing tank 141 in a bulk form of yttrium barium copper oxide (YBCO) and cooled by the freezing tank 141; a permanent magnet 143 rotatably provided to interact with the superconductor 142; a permanent magnet housing 144 provided to rotatably support the permanent magnet 143 at the outside of the permanent magnet 143; and a rotor reinforcing material 145.

Liquid nitrogen stored in the freezing tank 141 is an example of the invention, and may be replaced by liquid helium or the like.

Further, the electromagnet bearing 150 includes a stator core 151 supported by a stator supporter 151a, a stator coil 152 mounted to the stator core 151, and a rotor core 153 provided to support the upper and lower hollow shafts P.

Meanwhile, the magnet shield 170 is shaped like a cylinder having a predetermined thickness and interposed between the permanent magnet housing 144 and the rotor reinforcing material 145, so that interference between the magnetic force generated by the permanent magnet 143 of the superconductive bearing 140 and the magnetic force generated by the rotor core 153 of the electromagnet bearing 150 can be eliminated to minimize the rotation loss.

According to this embodiment, the magnet shield 170 is not separately disposed when installing the superconductive bearings 140 inside the hollow shaft P, but integrally assembled to be interposed between the permanent magnet housing 144 and the rotor reinforcing material 145, thereby enhancing assembly efficiency.

A configuration that the superconductive bearings 140 are disposed outside the rotor reinforcing material 145 is within the spirit of the invention for eliminating magnetic interference between the permanent magnet 143 and the rotor core 153, and is a simple design change.

In the large capacity hollow-type flywheel energy storage device according to the embodiment, magnetic interference between the superconductive bearings 140 and the electromagnet bearings 150 are easily prevented by the magnet shield 170, so that the superconductive bearings 140 and the electromagnet bearings 150 can be coaxially disposed inside and outside the hollow shaft P. Thus, there is no need for the shafts that have the same lengths as conventional ones.

Accordingly, a structural mechanism can be stabilized during rotation, thereby preventing rotation loss while improving design adaptability.

As described above, the large capacity hollow-type flywheel energy storage device according to the embodiment of the invention shields magnetic interference between the superconductive bearings and the electromagnet bearings through the magnet shield interposed therebetween, thereby preventing rotation loss by stabilizing the structural mechanism during rotation while improving design adaptability.

Although some embodiments have been provided to illustrate the invention, it be apparent to those skilled in the art that the embodiments are given by way of illustration, and that various modifications, changes, and substitutions can be made without departing from the spirit and scope of the invention. Accordingly, the scope of the invention should be limited only by the accompanying claims and equivalents thereof.

What is claimed is:

1. A large capacity hollow-type flywheel energy storage device including:
   a hollow shaft;
   a vacuum chamber receiving the hollow shaft;
   a flywheel having a predetermined weight and disposed at an inner edge of the vacuum chamber;
   a hub connecting the flywheel to the hollow shaft and disposed in the vacuum chamber to be rotatable together with the flywheel; and
   a magnet shield made of metal and cylindrically interposed between a superconductive bearing and an electromagnet bearing,
   wherein the superconductive bearing and the electromagnet bearing are disposed inside and outside the hollow shaft, respectively, such that magnetic forces thereof are shielded from each other.

* * * * *